US012755319B2

(12) United States Patent
Kalotay

(10) Patent No.: US 12,755,319 B2
(45) **Date of Patent: *Oct. 6, 2026**

(54) METHOD AND APPARATUS FOR PROVIDING AFTER TAX VALUATION OF TAX-EXEMPT BONDS

(71) Applicant: ICE Data Services, Inc., Bedford, MA (US)

(72) Inventor: Andrew J. Kalotay, New York, NY (US)

(73) Assignee: ICE Data Services, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/411,945

(22) Filed: Dec. 8, 2025

(65) Prior Publication Data

US 2026/0094211 A1 Apr. 2, 2026

Related U.S. Application Data

(63) Continuation of application No. 19/217,454, filed on May 23, 2025, now Pat. No. 12,524,814, which is a continuation of application No. 18/824,196, filed on Sep. 4, 2024, now Pat. No. 12,340,419, which is a continuation of application No. 18/430,176, filed on Feb. 1, 2024, now Pat. No. 12,112,382, which is a continuation of application No. 18/361,079, filed on Jul. 28, 2023, now Pat. No. 11,928,735, which is a continuation of application No. 17/965,379, filed on Oct. 13, 2022, now Pat. No. 11,756,125, which is a (Continued)

(51) Int. Cl.
*G06Q 40/06* (2012.01)
*G06Q 40/10* (2023.01)

(52) U.S. Cl.
CPC ............ *G06Q 40/06* (2013.01); *G06Q 40/10* (2013.01)

(58) Field of Classification Search
CPC .............................. G06Q 40/06; G06Q 40/10
See application file for complete search history.

(56) References Cited

U.S. PATENT DOCUMENTS

2008/0288416 A1 11/2008 Arnott et al.
2012/0078816 A1 3/2012 Braun et al.

OTHER PUBLICATIONS

Constantinides, George M., et al., "Valuation, Risk Analysis, and Management of Tax-Exempt Bonds," Journal of Financial Economics, 1984, 4 pages.

(Continued)

*Primary Examiner* — Scott S Trotter
(74) *Attorney, Agent, or Firm* — DLA Piper LLP (US)

(57) ABSTRACT

Methods and systems are disclosed for determining valuation and risk analysis of municipal debt instruments on an after-tax basis. In one embodiment, bond terms, yield curve and interest rate volatility data are received for a set of bonds. Additionally, IRS treatment data and applicable tax rates for the set of bonds and a purchaser of the bonds are also received. Theoretical tax-neutral values of the bonds are calculated using a buy-and-hold methodology, wherein the tax-neutral value comprises the price of the at least one municipal debt offering such that its discounted after-tax value equals the price. A theoretical maximum after-tax values of the bonds are also calculated using a recursive valuation path-dependent methodology. Optimal bond management is determined using the calculated theoretical tax-neutral values and maximum after-tax values of the bonds.

19 Claims, 9 Drawing Sheets

Related U.S. Application Data continuation-in-part of application No. 14/317,812, filed on Jun. 27, 2014, now abandoned, which is a continuation-in-part of application No. 13/779,011, filed on Feb. 27, 2013, now abandoned.

(56) References Cited

OTHER PUBLICATIONS

Kalotax, Andrew, "Option-Enhanced Tax-Smart Portfolio Value," The Journal of Portfolio Management, Apr. 2022, eight (8) pages.
Kalotay, Andrew and Davidson, III, R.B. (Guy), "Par Munis: Sub-Par Performance," The Journal of Fixed Income, Fall 2021, 14 pages.
Kalotay, Andrew and Fennell, Paul, "Commentary Coming Disclosure Issues with Discount Munis?," The Bond Buyer, Feb. 7, 2019, two (2) pages.
Kalotay, Andrew and Fennell, Paul, "Why Buy-and-Hold is Dead," The Bond Buyer, Feb. 24, 2015, one (1) page.
Kalotay, Andrew and Howard, C. Douglas, "The Tax Option in Municipal Bonds," The Journal of Portfolio Management, Winter 2014, 12 pages.
Kalotay, Andrew, Ph.D. and Davidson, Guy, "Managing Duration Extension and Negative Convexity Near Par," The Bond Buyer, Oct. 20, 2020, five (5) pages.
Kalotay, Andrew, Ph.D., "Tax-Smart Performance Measure," The Journal of Performance Measurement, Summer 2022, five (5) pages.
Kalotay, Andrew, "Tax Optimization of Municipal Bond Portfolios: Investment Selection and Tax Rate Arbitrage," The Journal of Portfolio Management, Fall 2018, eight (8) pages.
Kalotay, Andrew, "After-Tax Portfolio Value: The Missing Tax Option," Journal of Investment Management, vol. 14, No. 4, 2016, pp. 1-10.
Kalotay, Andrew, "Commentary Don't Let Your Tax-Loss Harvest Become a Harvest of Regret," The Bond Buyer, Jan. 30, 2018, two (2) pages.
Kalotay, Andrew, "Commentary: How to Take a Tax Loss and then Profit from Obamacare," The Bond Buyer, Dec. 11, 2013, three (3) pages.
Kalotay, Andrew, "Optimal Municipal Bond Portfolios for Dynamic Tax Management," Journal of Investment Management, vol. 14, No. 1, 2016, pp. 87-99.
Kalotay, Andrew, "Optimal Tax Management of Municipal Bonds," The Journal of Portfolio Management, Fall 2014, 13 pages.
Kalotay, Andrew, "Tax-Efficient Trading of Municipal Bonds," Financial Analysts Jouranl, vol. 72, No. 1, 2016, ten (10) pages.
Kalotay, Andrew, "Tax-Smart Management of Your Muni Portfolio," CFA Institute, Enterprising Investor, 2021, four (4) pages.
Kalotay, Andrew, "Tax-Smart Portfolio Valuation and Performance Measurement," The Journal of Portfolio Management, Aug. 2021, eight (8) pages.
Kalotay, Andrew, "The Interest Rate Sensitivity of Tax-Exempt Bonds under Tax-Neutral Valuation," Journal of Investment Management, vol. 12, No. 1, 2014 pp. 62-68.
Kalotay, Andrew, "The Interest Rate Sensitivity of Tax-Exempt Bonds under Tax-Neutral Valuation," pp. 1-11.
Kalotay, Andrew, "The True Value of Your Muni Portfolio," CFA Institute, Enterprising Investor, Apr. 22, 2021, four (4) pages.
Kalotay, Andy and Fennell, Paul, "Potential Disclosure Issues with Discount Munis?," The Bond Buyer, Mar. 7, 2022, three (3) pages.
Leibowitz, Martin L., et al., "Volatility in Tax-Exempt Bonds: A Theoretical Model," Chapter III G-3, Financial Analysts Journal, Nov./Dec. 1981, pp. 1123-1154.

METHOD AND APPARATUS FOR PROVIDING AFTER TAX VALUATION OF TAX-EXEMPT BONDS

CROSS REFERENCE TO RELATED APPLICATIONS

This is a continuation of U.S. application Ser. No. 19/217,454, filed May 23, 2025 (now U.S. Pat. No. 12,524,814), which is a continuation of U.S. application Ser. No. 18/824,196, filed Sep. 4, 2024 (now U.S. Pat. No. 12,340,419), which is a continuation of U.S. application Ser. No. 18/430,176, filed Feb. 1, 2024 (now U.S. Pat. No. 12,112,382), which is a continuation of U.S. application Ser. No. 18/361,079, filed Jul. 28, 2023 (now U.S. Pat. No. 11,928,735), which is a continuation of U.S. application Ser. No. 17/965,379, filed Oct. 13, 2022 (now U.S. Pat. No. 11,756,125), which is a continuation-in-part of U.S. application Ser. No. 14/317,812, filed Jun. 27, 2014 (now Abandoned), which is a continuation-in-part of U.S. application Ser. No. 13/779,011, filed Feb. 27, 2013 (now Abandoned).

TECHNICAL FIELD

The field of the disclosure generally relates to the valuation of bonds and, more particularly, to determining valuation and risk analysis of municipal debt instruments, such as bonds.

BACKGROUND

While interest on municipal bonds is generally exempt from federal income taxes, capital gains and losses are subject to complex tax treatment that affects a bond's performance. For example, because the gain on a bond purchased at a discount (to the relevant basis) and held to maturity (buy-and-hold) is subject to taxes, the after-tax yield of the investment will be lower than the pretax yield. On the other hand, investors may be able to improve performance over a buy-and-hold policy by selling the bond and recognizing losses for tax purposes when the bond's price declines sufficiently and reinvesting the proceeds in a like security.

The effect of taxes is recognized by investors. For example, the prices of tax-exempt bonds are routinely converted to so-called after-tax cash flow yields, with the underlying assumption being that the bonds will be held to maturity. Converting a bond's price to an after-tax yield is straightforward, and it allows investors to compare the yields of alternative investments.

It is known that active tax management can produce superior performance over a conventional buy-and-hold policy. Accordingly, there is a need for a more accurate and analytical system and methodology to implement bond valuation and risk management, i.e., it provides the sell signals required for optimal management. Any added value derived from optimal management, the so-called tax option, can be a by-product of the analysis.

SUMMARY OF THE DISCLOSURE

The present disclosure is directed to exemplary methods, exemplary apparatus and exemplary systems that determine valuation and risk analysis for municipal debt instruments such as, but not limited to, municipal bonds.

Embodiments disclosed herein encapsulate determining the theoretical tax-neutral value (explained below) and the maximum value of tax-exempt bonds, given standard market-related information (relevant yield curve and interest rate volatility) and tax considerations (IRS treatment and applicable tax rates). The tax-neutral value is determined assuming buy-and-hold strategy, while the maximum value is derived assuming optimal tax management.

A computer-implemented method of calculating the after-tax value of a municipal debt instrument includes: receiving, by a computing system including a processor and a data storage medium, terms, yield curve and interest rate volatility data for at least one municipal debt offering; receiving, by the computing system, IRS treatment data and applicable tax rates for the at least one municipal debt offering and a purchaser of the at least one municipal debt offering; calculating, by the computing system, a theoretical tax-neutral value of the at least one municipal debt offering using a buy-and-hold methodology, wherein the tax-neutral value includes the price of the at least one municipal debt offering such that its discounted after-tax value equals the price; calculating, by the computing system, a theoretical maximum after-tax value of the at least one municipal debt offering using a recursive valuation path dependent methodology; and determining, by the computing system, optimal management of the at least one municipal debt offering using the calculated theoretical tax-neutral value and maximum after-tax value of the at least one municipal debt offering.

A system for calculating the after-tax value of a municipal debt instrument includes: a computer system comprising at least one processor and an operably connected data storage medium, wherein the at least one processor is configured for receiving information associated with at least one municipal debt offering and storing the received information in the data storage medium, wherein the processor is further configured for directing the function of the following devices: a first receiving device configured to receive terms, yield curve and interest rate volatility data for at least one municipal debt offering; a second receiving device configured to receive IRS treatment data and applicable tax rates for the at least one municipal debt offering and a purchaser of the at least one municipal debt offering; a first calculating device configured to calculate a theoretical tax-neutral value of the at least one municipal debt offering using a buy-and-hold methodology, wherein the tax-neutral value includes the price of the at least one municipal debt offering such that its discounted after tax value equals the price; a second calculating device configured to calculate a theoretical maximum after-tax value of the at least one municipal debt offering using a recursive valuation path dependent methodology; and a determining device configured to determine optimal management of the at least one municipal debt offering using the calculated theoretical tax-neutral value and maximum after-tax value of the at least one municipal debt offering.

A non-transitory computer readable storage medium having program instructions stored thereon that, if executed by a computing device, cause the computing device to perform operations for calculating the after-tax value of a municipal debt instrument, the operations including: receiving, by a computing system including a processor and a data storage medium, terms, yield curve and interest rate volatility data for at least one municipal debt offering; receiving, by the computing system, IRS treatment data and applicable tax rates for the at least one municipal debt offering and a purchaser of the at least one municipal debt offering; calculating, by the computing system, a theoretical tax-neutral value of the at least one municipal debt offering using a buy-and-hold methodology, wherein the tax-neutral value includes the price of the at least one municipal debt offering such that its discounted after-tax value equals the price; calculating, by the computing system, a theoretical maximum after-tax value of the at least one municipal debt offering using a recursive valuation path dependent methodology; and determining, by the computing system, optimal management of the at least one municipal debt offering using the calculated theoretical tax-neutral value and maximum after-tax value of the at least one municipal debt offering.

Aspects of the present disclosure also relate to systems, methods and non-transitory computer readable medium for determining valuation and risk analysis for tax-exempt municipal bonds on an after-tax basis. A system includes a communications interface, a data storage medium, a database, a processing server and a display device. The communications interface is coupled to one or more data sources and one or more external devices, and is configured to receive market price data, bond data and tax data from among the one or more data sources for one or more tax-exempt municipal bonds. The data storage medium stores program code comprising an option-adjusted spread valuation engine and a predefined tax logic data interpretation process. The database is configured to store the received bond data and the received tax data. The bond data comprises terms, yield curve data and interest rate volatility data for the one or more tax-exempt municipal bonds. The tax data comprises IRS tax rate treatment data and applicable tax rates for the one or more tax-exempt municipal bonds. The processing server includes at least one processor configured to execute the program code. Execution of the program code causes the option-adjusted spread valuation engine to: receive an indication of a specific bond among the one or more tax-exempt municipal bonds through the communications interface; retrieve, from the database, the terms, the yield curve data and the interest rate volatility data among the stored bond data for the specific bond; and retrieve, from the database, the IRS tax rate treatment data and the applicable tax rates among the stored tax data for the specific bond. The option-adjusted spread valuation engine also determines, according to the predefined tax logic data interpretation process, a tax-neutral fair value of the specific bond based on: (1) the retrieved terms; (2) the retrieved yield curve data and the retrieved interest rate volatility data; (3) the retrieved IRS tax rate treatment data and the retrieved applicable tax rates; and (4) the market price data, such that the tax-neutral fair value is reflective of the market price data. The option-adjusted spread valuation engine also, using the determined tax-neutral fair value of the specific bond and the market price data, determines, according to a recursive valuation path dependent methodology, indicators including: (a) a value of the specific bond enhanced by a tax option; (b) a value of the tax option; and (c) whether to sell the specific bond and take a loss, such that a performance of the specific bond over a buy-and-hold policy is improved, by indicating when to sell the specific bond and by indicating when a loss for tax purposes will occur. The display device is configured to receive and display the indicators for use by investors for optimal tax management of the specific bond. The at least one processor is configured to update one or more of the indicators displayed on the display device responsive to changes in at least one of the market price data and the interest rate volatility data for the specific bond.

BRIEF DESCRIPTION OF THE DRAWINGS

The accompanying drawings, which are incorporated herein and form part of the specification, illustrate exemplary embodiments of the present disclosure and, together with the description, further serve to explain principles, aspects and features of the present disclosure. The exemplary embodiments are best understood from the following detailed description when read in conjunction with the accompanying drawings. It is emphasized that, according to common practice, the various features of the drawings are not to scale. On the contrary, the dimensions of the various features are arbitrarily expanded or reduced for clarity. Included in the drawings are the following figures.

Figure 1:
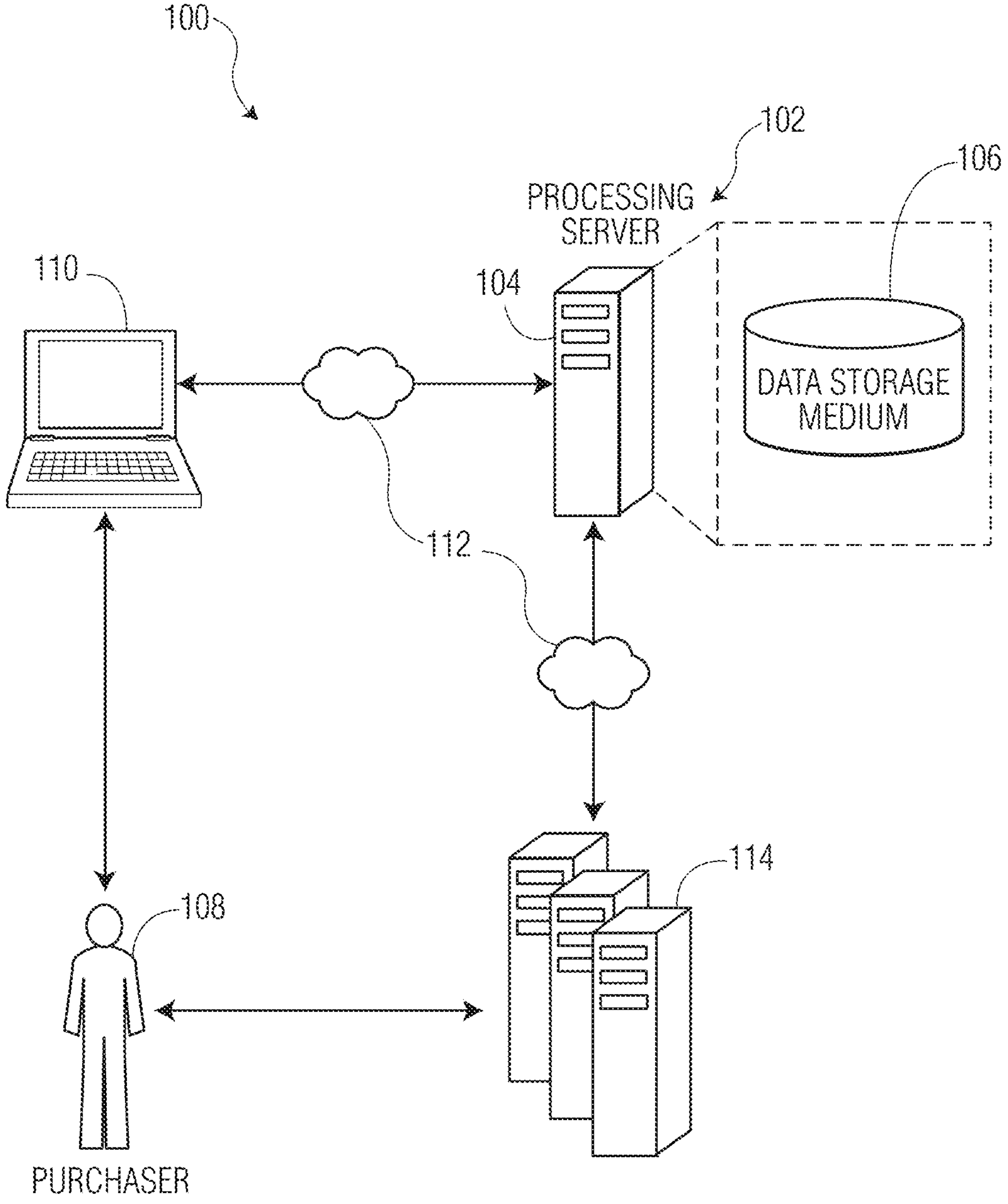
FIG. 1 is a diagram illustrating a system for the valuation and risk analysis of municipal debt instruments in accordance with exemplary embodiments.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present disclosure relates to systems and methods for determining valuation and risk analysis for municipal debt instruments to determine optimal management of the municipal debt instruments. Embodiments of the systems and methods disclosed herein determine and utilize a theoretical tax-neutral value for the municipal debt instruments, such as, but not limited to, bonds.

Definition of Terms

Bonds—In finance terms, a bond is a debt security in which the authorized issuer owes the holders ("bondholders") a debt and, depending on the terms of the bond, is obliged to pay interest (referred to as the "coupon") to use and/or to repay the principal at a later date, termed maturity. A bond is a formal contract to repay borrowed money with interest at fixed intervals (e.g., semiannual, annual, monthly, etc.).

Thus, a bond is like a loan, in that the holder of the bond is the lender (creditor), the issuer of the bond is the borrower (debtor), and the coupon is the interest. Bonds provide the borrower with external funds to finance long-term investments or, in the case of government bonds, to finance current expenditure.

Bonds and stocks are both securities. The major difference between bonds and stocks is that stockholders have an equity stake in the company (i.e., they are owners), whereas bondholders have a creditor stake in the company (i.e., they are lenders). Another difference is that bonds usually have a defined term, or maturity, after which the bond is redeemed. On the other hand, stocks may be outstanding indefinitely. An exception to a defined term being associated with a bond is a consol bond, which has no maturity.

Nominal, Principal or Face Amount (often called "Par")—The amount on which the issuer pays interest, and which, most typically, has to be repaid at the end of the term. Some structured bonds have what is known as a redemption amount, which is different from the face amount, and which can be linked to the performance of particular assets (e.g., a stock or commodity index, a foreign exchange rate, a fund, etc.). This can result in an investor receiving less or more than his/her original investment at maturity.

Issue Price—The price at which investors buy the bonds when they are first issued. The net proceeds that the issuer of the bond receives are the issue price, minus the issuance fees/expenses. If the bond happens to be sold at an auction, the issue price can vary.

Maturity Date—The date on which the issuer has to repay the nominal amount. As long as all payments have been made during the life of the bond, the issuer has no more obligations to the bond holders after the maturity date. The length of time until the maturity date is often referred to as the term, tenor, or maturity of a bond. The term of a bond can be any length of time. Debt securities with a term of less than one year are, however, generally considered to be money market instruments rather than bonds. The term of most bonds is up to thirty years. Of course, some bonds have been issued with terms of up to one hundred years, and some bonds have been issued that do not mature at all.

Coupon—The interest rate that the issuer pays to the bond holders. Typically, this rate is fixed throughout the life of the bond. However, for floating rate bonds, it can also vary with a money market index (e.g., the London Inter-Bank Offered Rate (LIBOR)), or it can be even more exotic. The name "coupon" originates from the fact that in the past, physical bonds were issued which had actual coupons attached to them. On the coupon date(s), the bond holder would give the coupon to a bank in exchange for the payment of the principal and interest (e.g., the face amount).

Coupon Dates—The dates on which the issuer pays the coupon to the bondholders. For a semi-annual bond the issuer pays a coupon every six months.

Municipal Bonds

A municipal bond is a bond issued by a township, borough, city, state, U.S. Territory, local government, or their agencies. Interest income received by holders of municipal bonds is typically exempt from federal income tax, and often also from the income tax of the state in which they are issued. Although municipal bonds issued for certain purposes (e.g., private purposes) may not be tax exempt.

Municipal bonds are typically issued for the purpose of financing the infrastructure needs of the issuing municipality. These needs vary greatly, but can include, for example, schools, roads, streets, highways, bridges, hospitals, public housing, sewer systems, water systems, power systems, power utilities, and various other public projects. Essentially, through the purchase of a municipal bond, the investor is lending money to the issuer (i.e., the municipality) who promises to repay to the investor the principal plus a fixed or variable amount of interest over time. These investors are called bondholders. Repayment periods can be as short as a few months (although this is rare) to 20, 30, or 40 years, or even longer. Municipal bonds are guaranteed by the government agency of issue.

The municipal issuer that issues the municipal bonds, such as, for example, townships, boroughs, states, cities, counties, etc., typically does so to raise funds for public interest projects for which they do not have immediate funds at their disposal. Alternately, the municipality may have the funds, but not desire to use them. Bonds bear an interest either at a fixed or a variable rate, and can be subject to either, or both, minimum and/or maximum legal limits. Most municipal notes and bonds are issued in minimum denominations of $5,000, or multiples of $5,000.

In some instances, a bond measure may be used in order to sell bonds. A bond measure is an initiative to sell bonds for the purpose of acquiring funds for various public works projects, such as, for example, research, transportation infrastructure improvements, educational improvements, and others. These bond measures are put up for a vote in general elections, and must generally be approved by a majority of voters. Such measures are often used in the United States when other revenue sources, such as taxes, are limited or non-existent.

Municipal bonds are generally a highly sought after investment because of their tax-exempt status. Income generated from the purchase of a municipal bond may be exempt from federal, state or local income taxes, depending on the intent of the bond and the laws of each state. For instance, bonds issued for projects intended for the common good (i.e., municipal bonds) are generally classified as tax exempt. Bonds that fund projects for the benefit of private parties are not classified as tax exempt (e.g., offering bonds to support a company coming into the area). Typically, an investor will receive a lower interest rate payment on municipal bonds than on other private bonds because of their special tax exempt status (assuming comparable risk). This makes the issuance of municipal bonds an attractive source of financing to many municipal entities, as the borrowing rate available in the open market is frequently lower than what is available through other borrowing channels.

Municipal bondholders purchase bonds either directly from the issuer at the time of issuance (on the primary market), or from other bond holders at some time after issuance (on the secondary market). In exchange for an upfront investment of capital, the bondholder receives payments over time composed of interest on the invested principal, and a return of the invested principal itself.

One of the primary reasons municipal bonds are considered separately from other types of bonds is their special ability to provide tax-exempt income. Interest paid by the issuer to bondholders is often exempt from all federal taxes, as well as state or local taxes, depending on the state in which the issuer is located, subject to certain restrictions. However, bonds issued for certain purposes may be subject to the alternative minimum tax.

The type of project or projects that are funded by a bond affects the taxability of income received on the bonds held by the bondholders. Interest earnings on bonds that fund projects that are constructed for the public good are generally exempt from federal income tax. Interest earnings on bonds issued to fund projects partly or wholly benefiting only private parties, sometimes referred to as private activity bonds, may be subject to federal income tax. However, qualified private activity bonds, whether issued by a governmental unit or private entity, are exempt from federal taxes because the bonds are financing services or facilities that, while meeting the private activity tests, are needed by a government.

Municipal securities consist of both short term issues (often called notes, which typically mature in one year or less) and long term issues (commonly known as bonds, which mature after more than one year). Short term notes are typically used by an issuer to raise money for a variety of reasons (e.g., in anticipation of future revenues such as taxes, state or federal aid payments, and future bond issuances; to cover irregular cash flows; meet unanticipated deficits; raise immediate capital for projects until long term financing can be arranged; etc.). Bonds are usually sold to finance capital or public interest projects over the longer term.

After-Tax Valuation

The present disclosure is an extension of the conventional arbitrage-free bond valuation method (usually referred to as the option-adjusted spread (OAS)) to incorporate taxes. In the absence of taxes, the required inputs are the terms of the bond, and the appropriate yield curve and interest rate volatility. The output of the analysis is the fair (pre-tax) value. A related application is to determine the OAS given the bond's price.

With the present disclosure, similar calculations can be performed on an after-tax basis. Present systems and methods may be implemented using an option-free municipal yield curve.

The initial step in applying the present disclosure is the computation of the fair tax-neutral value of a bond under the buy-and-hold policy ("fair value"), which is the theoretical minimum. The fair value provides the foundation for three applications, namely, risk management, optimum tax management, and pricing.

The determination of fair value allows the present disclosure to rigorously determine standard risk measures for a bond given its price. These risk measures include, but are not limited to, effective duration, effective convexity, and key rate durations. The interest rate sensitivity of a tax-exempt bond can be significantly greater than that of like taxable bond. The fair value is also essential to determine the after-tax performance of a bond under a specified interest rate scenario over time (user-specified or computer-generated). In this case the fair tax-neutral value can be used to estimate future prices.

A fundamentally different application of the present disclosure is to determine the optimal policy of managing bonds taking into account tax considerations. Astute investors realize that selling a bond at a loss may be preferable to holding it until maturity: the loss can be recognized for tax purposes, and thus reduce taxes. The proceeds from the sale can be reinvested in a similar bond.

The basic problem in optimizing the tax strategy is to determine when to sell (e.g., when to take a loss). Relevant factors include transaction cost (bid-ask spread) and price volatility. During periods of declining prices, repeated sales result in higher accumulated transaction costs, thus hindering performance.

Based on the present disclosure, methodology has been developed that optimizes after-tax performance. The methodology is implemented by recursive valuation of a bond under a 'path-dependent' strategy—the decision depends on the price at which the bond was purchased. However, recursive valuation of path-dependent bonds is analytically complex.

The present disclosure enables an investor to quantify the added value of a bond over the 'buy-and-hold' strategy, assuming that it is managed optimally from a tax perspective over its life. This added value is referred to as the "embedded tax option". As previously mentioned, this value depends, among other things, on the volatility of prices (interest rates) and on bid-ask spreads. In addition, the value depends upon future bid/ask prices. In the 'base case', it is assumed that the bid prices are the fair values less transaction cost. Under realistic assumptions, the value of the tax option embedded in long-term municipal bonds ("munis") can amount to several points (percent of face value).

The basic building block in the present disclosure is the tax-neutral value under the buy-and-hold policy, which is the theoretical minimum price. Assuming that bonds trade in the vicinity of this fair value, investors can improve their performance over buy-and-hold by optimal tax management. This insight can be incorporated into determining the pricing of the bond. Specifically, if trading near the fair value allows sophisticated investors to extract added value over buy-and-hold, the market price of the bond could reflect this possibility. Thus, the market price could by higher than the fair value. The question is by how much higher. The present disclosure allows an investor to determine the theoretical maximum price (optimal tax arbitrage price). Given the minimum and the maximum, an average can be taken to estimate the price used, for example, by mutual funds, to calculate net asset values at the end of the day.

System for the Valuation and Risk Analysis of Municipal Debt Instruments

FIG. 1 illustrates and exemplary system 100 for carrying out the disclosed exemplary municipal bond valuation and risk analysis method. The system 100 can include a computing system 102 that includes a processing server 104, that includes a processor, and a data storage medium 106 (e.g., random access memory (RAM) and/or read only memory (ROM)). Stored in the storage medium 106 are the various programs run on the system 100 by the processor, as well as a data store or database including other information relevant to the disclosed system and method, such as, but not limited to terms, yield curve and interest rate volatility data for the municipal debt instruments, and additionally IRS treatment data and application tax rates (income, short and long term, capital gains) for the municipal debt instruments and a purchaser 108 of the municipal debt instruments.

The various data with respect to the purchaser and the municipal debt offering may be received by the computing system 102 from the purchaser 108 through a purchaser computer device 110 via a network 112, and from various other public and private computer devices and servers 114 via the network 112. The network 112 may be any network suitable for performing the functions as disclosed herein and may include a local area network (LAN), a wide area network (WAN), a wireless network (e.g., Wi-Fi), a mobile communication network, a satellite network, the Internet, fiber optic, coaxial cable, infrared, radio frequency (RF), or any combination thereof. Other suitable network types and configurations will be apparent to persons having skill in the relevant art.

The storage medium 106 may include any type of suitable computer readable media, such as, but not limited to, optical storage (e.g., compact disc, digital versatile disc, Blu-ray disc, etc.) or magnetic tape storage (e.g., hard disc drive). The storage medium 106 may be configured in any type of suitable database configuration, such as a relational database, a structured query language (SQL) database, a distributed database, an object database, etc. Suitable configurations and database storage types will be apparent to persons having skill in the relevant art. The databases may each be a single database, or may comprise multiple databases which may be interfaced together (e.g., physically or via a network, such as the network 112).

Method for Determining Valuation and Risk Management

Figure 2:
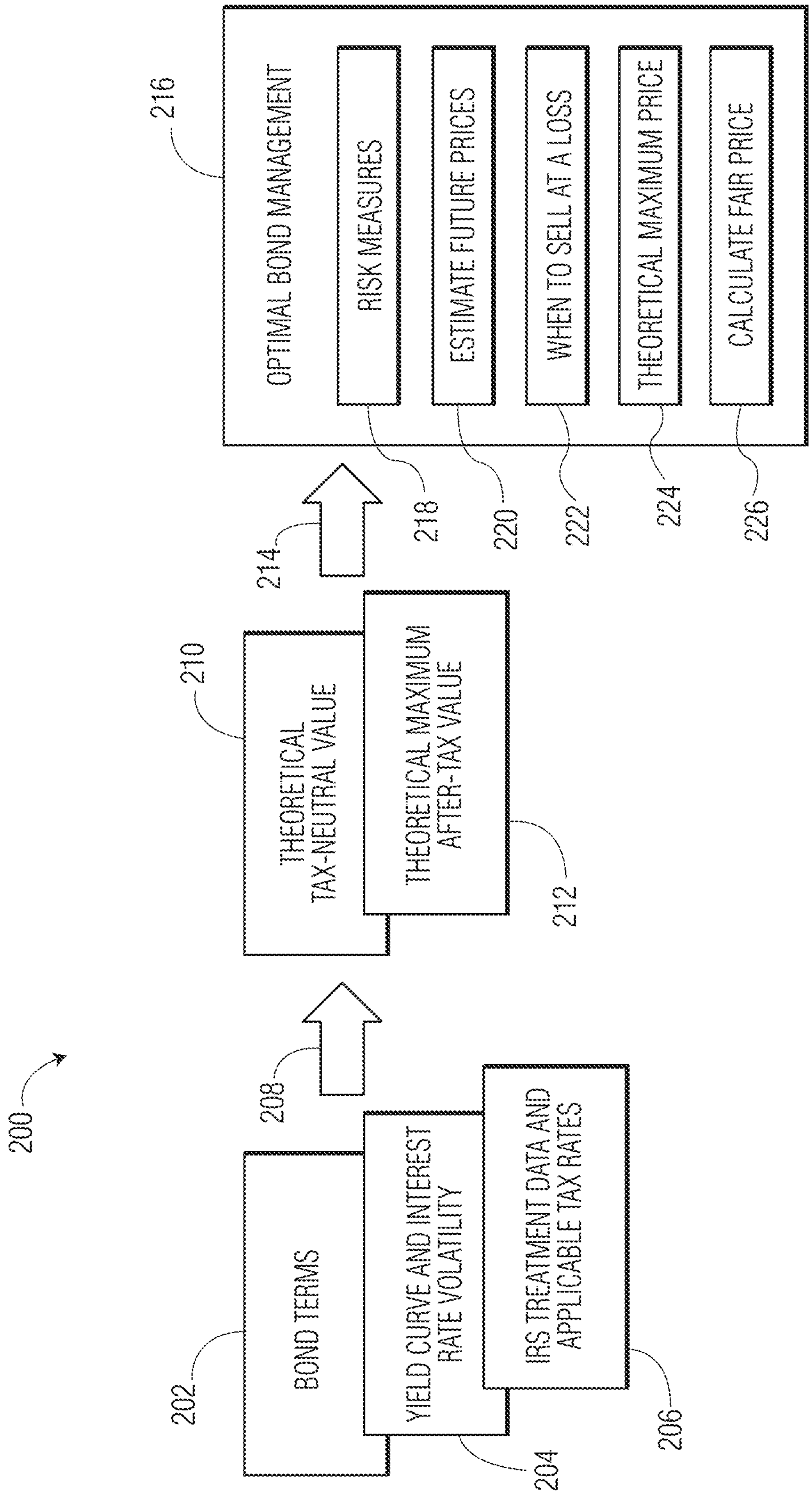
FIG. 2 is a flowchart illustrating a method of determination valuation and risk management in accordance with an exemplary embodiment of the present disclosure.

FIG. 2 is a flowchart illustrating a method 200 of determination valuation and risk management in accordance with an exemplary embodiment of the present disclosure. FIG. 2 is described with continued reference to the embodiment illustrated in FIG. 1, but is not limited to that embodiment.

Method 200 begins when bond series terms 202, yield curve and interest rate volatility data 206 and IRS treatment data and applicable tax rates 206 are received by first and second receiving devices of the computing system 102. The first and second receiving devices may be the same device. The bond series terms 202 can quote to an issuer by various underwriters. The bonds being evaluated by method 200 may have respective option-adjusted spreads determined based on corresponding yield curves relative to a benchmark yield curve and based on an interest rate volatility factor. The yield curve date may include any suitable benchmark yield curve, such as, but not limited to those disseminated by Municipal Market Data's (MMD), and Municipal Market Advisors (MMA).

In step 208, the various data 202, 204, 206 are passed to a first calculating device which calculates a theoretical tax-neutral value 210 of the at least one municipal debt offering using a buy-and-hold methodology, such that the tax-neutral value includes the price of the at least one municipal debt offering such that its discounted after-tax value equals the price. The various data 202, 204, 206 are also passed to a second calculating device which calculates a theoretical maximum after-tax value 212 of the at least one municipal debt offering using a recursive valuation path dependent methodology. The theoretical maximum after-tax value of the at least on municipal debt offering may be calculated using an issuer-specific optionless (par) yield curve for discounting and for valuing options at a specified interest rate volatility. The first and second calculating devices may be the same device.

In step 214, the theoretical tax-neutral value 210 and the theoretical maximum after-tax value 212 are passed to as determining device which determines optimal management 216 of the at least one municipal debt offering using the calculated values 210, 212. The optimal management 216 can include determining risk measure 218, estimating future prices 220, identifying when to sell at a loss 222, calculating a theoretical maximum price 224, and/or calculating net asset value 226. In some embodiments, the optimal management 216 may also include identifying for a taxable issuer when to buy back bonds at a premium to book value on the secondary market, such that the issuer can realize a tax benefit by paying a higher price than the par or cost to the issuer of the bond if held to maturity. Methods for determining the optimal management 216 are discussed in more detail below.

Method for Calculating the Tax-Neutral Value of a Municipal Debt Instrument

Figure 3:
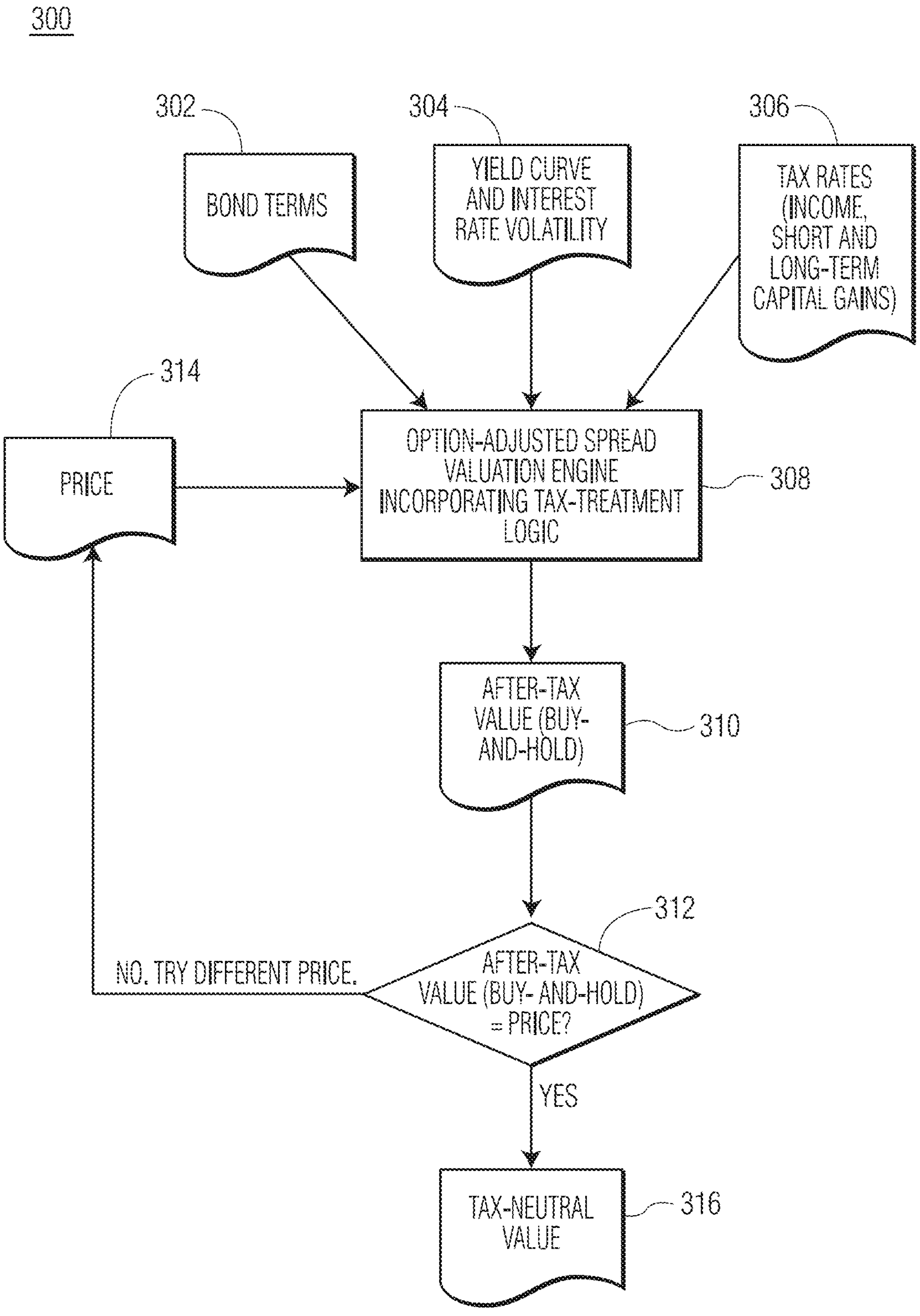
FIG. 3 is a flowchart illustrating an exemplary calculation of the tax-neutral value of a municipal debt instrument.

FIG. 3 is a flowchart illustrating an exemplary method 300 for the calculation the tax-neutral value of a municipal debt instrument, such as performed in step 210 of FIG. 2. The method 300 begins when bond series terms 302, yield curve and interest rate volatility data 304 and tax rates (income, short and long term, capital gains) 306 are received. The data 302, 304, 306 is passed to calculating device(s), such as an option-adjusted spread valuation engine incorporating tax treatment logic, at step 308. The calculating device(s) calculates the after-tax value of the municipal debt instrument using the buy-and-hold methodology, at step 310. Then, it is determined whether the calculated after-tax value equals the price of the municipal debt instrument, at step 312. If the answer is "no", a different price is utilized at step 314, and steps 308, 310 and 312 are repeated. If the answer is "yes" at step 312, the after-tax value is set as the tax-neutral value, at step 316.

A detailed example of identifying the tax-neutral value of a municipal debt instrument is discussed in more detail below with respect to FIG. 6.

Method for Determining Optimal Debt Management of a Municipal Debt Instrument

Figure 4:
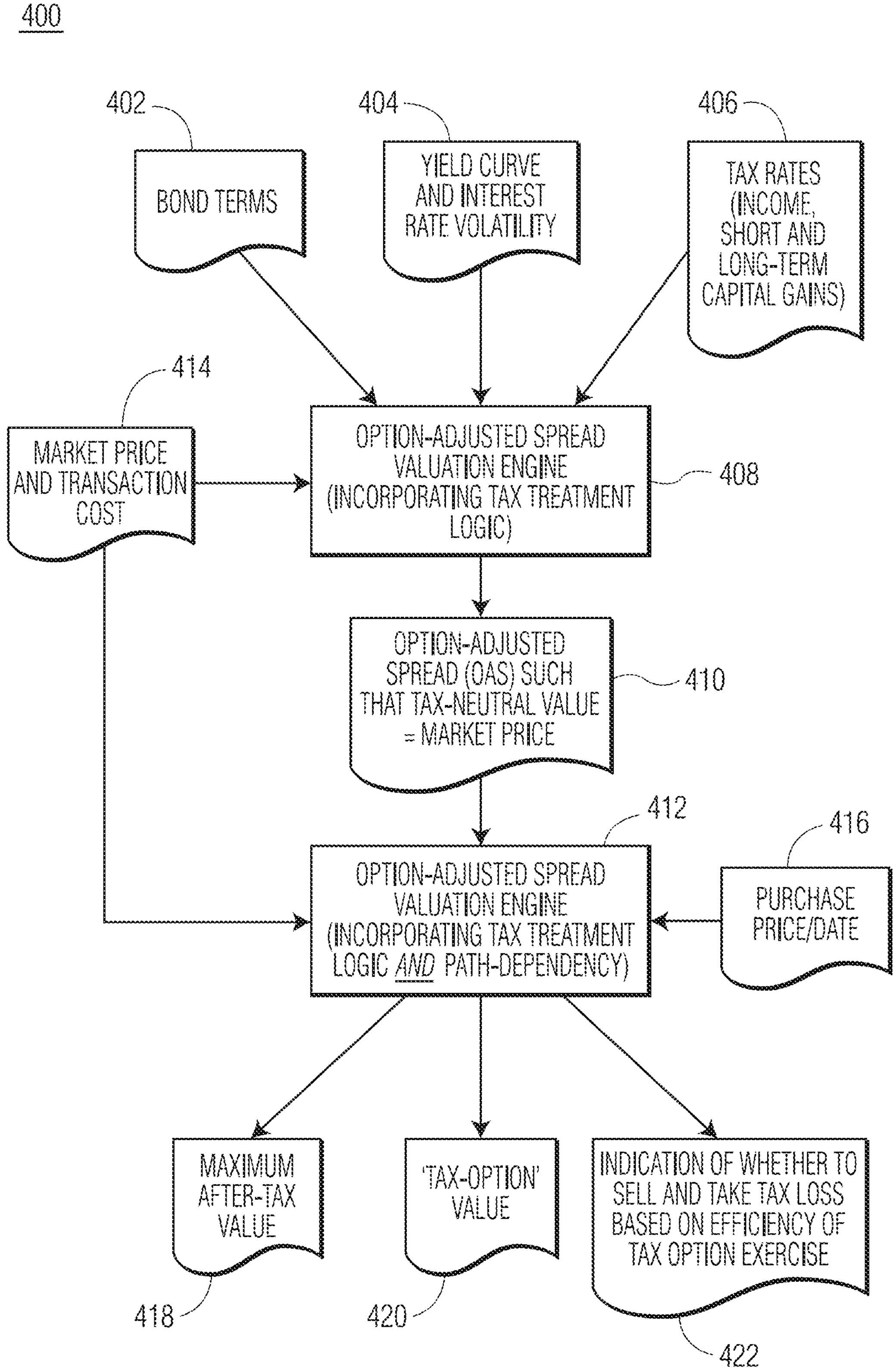
FIG. 4 is a flowchart illustrating an exemplary determination of optimal management for a municipal debt instrument.

FIG. 4 is a flowchart illustrating an exemplary method 400 for determination of optimal management for a municipal debt instrument, such as the optimal management 216 of FIG. 2. Method 400 begins when bond series terms 402, yield curve and interest rate volatility data 404 and tax rates (income, short and long term, capital gains) 406 are received. The data 402, 404, 406 is passed to calculating device(s), such as an option-adjusted spread valuation engine incorporating tax treatment logic, at step 408. The calculating device(s) performs operations using an option-adjusted spread (OAS) using a benchmark yield curve to calculate the tax-neutral value of the municipal debt offering, such that the tax-neutral value equals the market price, at step 410. The tax-neutral value is passed to an additional calculating device, such as an option-adjusted spread valuation engine, at step 412. The option-adjusted spread engine incorporate tax treatment and path dependency, and also received market price 414 and purchase price/date 416 data for the municipal debt offering. Depending on the path chosen for the optimal management, the option adjusted spread engine at step 412 calculates/determines: (a) the maximum after-tax value of the municipal debt offering, at step 418; (b) the 'tax option' value, at step 420; and (c) whether to sell the municipal debt offering and take a loss, at step 422. The indicators at steps 418, 420 and 422 can be used by investors for optimal management of the municipal debt instrument.

At step 412, the option adjusted spread engine may, in addition or alternatively, calculate/determine the optimal time for a taxable issuer to buy back bonds at a premium to book value. In such an instance, the optimal management of the bond may include determining the optimal time for the issuer to take a tax loss, using the method 400 illustrated in FIG. 4.

Method for Determining Risk Measures Associated with Municipal Debt Instruments

Figure 5:
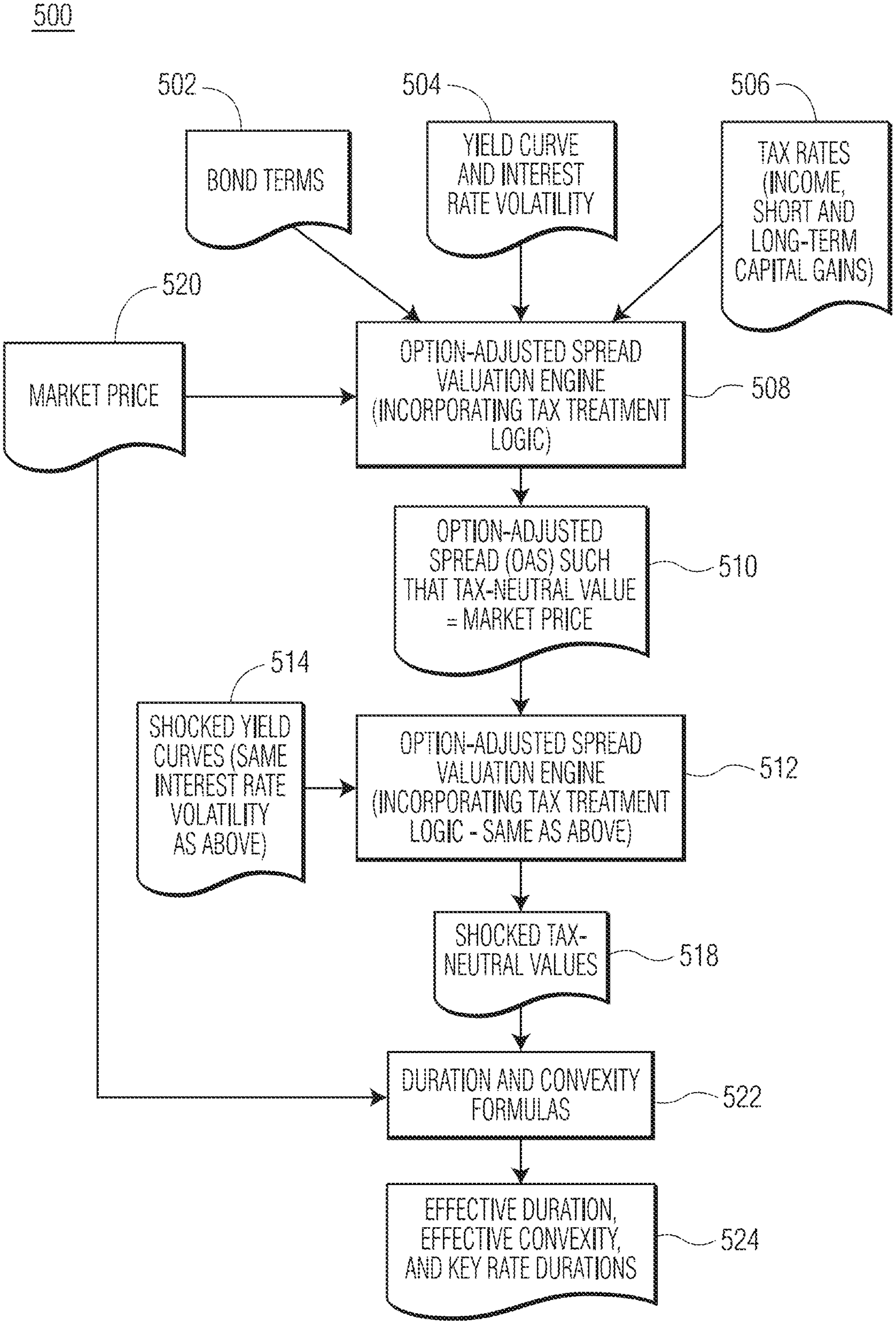
FIG. 5 is a flowchart illustrating an exemplary determination of risk measures associated with a municipal debt instrument.

FIG. 5 is a flowchart illustrating an exemplary determination of risk measures associated with a municipal debt instrument. Method 500 begins when bond series terms 502, yield curve and interest rate volatility data 504 and tax rates (income, short and long term, capital gains) 506 are received. The data 502, 504, 506 is passed to calculating device(s), such as an option-adjusted spread valuation engine incorporating tax treatment logic, at step 508. The calculating device(s) performs operations using an option-adjusted spread (OAS) using a benchmark yield curve to calculate the tax-neutral value of the municipal debt offering, such that the tax-neutral value equals the market price, at step 510. The tax-neutral value from step 512 is passed to an option-adjusted spread valuation engine, at step 512, which is similar to the option-adjusted spread engine of step 508. However, the option-adjusted spread engine at step 512 also receives a 'shocked' benchmark yield curve (i.e. a benchmark yield that has been shifted up or down by a certain number of basis points, say 30 bps), at step 514, and calculates shocked tax-neutral values using the shocked benchmark yield curve, at step 516. The shocked tax-neutral values, as well as market price data 520, are received at step 522. Using standard duration and convexity formulas at step 522, risk measurement values are determined at step 524, which include parameters such as effective duration, effective convexity and key rate durations.

Exemplary Implementation of Present Methods

As discussed above, while interest payments on municipal bonds are generally exempt from federal income taxes, capital gains and losses are subject to complex tax treatment. Taxes affect investors' after-tax performance. For example, because the gain on a bond purchased in the secondary market at a discount and held to maturity is subject to taxes, the after-tax yield of the investment will be lower than the pre-tax yield. The prices of discounted tax-exempt bonds are routinely converted to so-called after-tax cash flow yields to maturity. Converting price to an after-tax yield is straightforward, and it allows investors to compare alternative investments on an-apples-to-apples basis.

The prices of tax-exempt bonds generally reflect these complex tax considerations. In the present disclosure, the conventional arbitrage-free method of bond valuation (the so-called OAS approach) is extended to incorporate tax effects. First, the tax-neutral ("fair") value of a bond assuming a buy-and-hold policy is determined as illustrated in FIG. 3 and discussed above. This fair value provides the basis for rigorous risk analysis. As will be seen, the interest rate sensitivity of a municipal bond can be significantly greater than that of a like taxable bond.

The implications of this observation are far-reaching. At present, standard commercially available analytical systems do not take taxes into account. This is particularly troublesome in the case of ETF's and mutual funds that attempt to replicate the performance of a large index—which may consist of over 10,000 bonds—with a few hundred securities. Matching durations on a pre-tax basis does not assure that the same relationship holds when the effect of taxes is properly accounted for. In light of this, the large tracking errors of these "index-matching" portfolios do not come as a surprise.

Investors who purchase a bond in the secondary market at a discount and hold it to maturity or call are taxed on the gain. At a modest discount to par (a so-called de minimis discount, defined as less than 0.25 times the number of years remaining to maturity), the applicable rate is the relatively low capital gains rate (at or around the time of drafting, 15% if long-term). If the discount exceeds the de minimis threshold, the entire gain is taxed at the higher ordinary income rate (35% at the time of drafting). It is also noted that the loss on a bond purchased at a premium and held to maturity has no tax effect.

To determine the tax-neutral value ("fair value") of tax-exempt municipal bonds, an arbitrage-free analysis method may be used such as illustrated in FIG. 3 and discussed above. In the absence of taxes and options, the fair value may be obtained by discounting prospective cash flows at the appropriate spot rates. If options are present, such discounting is performed on a lattice. The taxation of municipal bonds complicates the calculation, because the cash flows depend on the purchase price; roughly speaking, the lower the purchase price the more taxes will be due when the bond is retired.

As discussed above, the tax-neutral (fair) value is defined as the price which is equal to the present value of future after-tax cash flows (i.e., interest and principal payments minus the taxes paid at the time of redemption). Simply put, the fair value is the "pretax" value adjusted for taxes. Because taxes depend on the purchase price, in the case of a callable bond, the fair value has to be determined iteratively, as the timing of the tax payment depends on the evolution of interest rates. The calculation can be simplified if the bond is optionless, as illustrated below.

Assume the bond has 10 years remaining to maturity, its pretax value is 80, the discount factor for a cash flow occurring 10 years from now is 0.40, and the tax rate applicable to the gain is 35%.

Solving $V=80-0.4*0.35*(100-V)$ gives the fair value $V=76.744$.

Next, the fair values of various structures are determined. For comparison purposes, the values are also shown in the absence of taxes. The calculations are based on the yield curve displayed in Table 1 below. The assumed base case volatility is 20%. The long-term capital gains rate is 15%, and the tax rate applicable to ordinary income rate is 35%.

TABLE 1

| Issuer's Optionless Par Yield Curve | | | | | | | |
|---|---|---|---|---|---|---|---|
| Maturity(yrs) | 1 | 2 | 5 | 10 | 15 | 20 | 30 |
| Rate (%) | 1.0 | 1.5 | 2.0 | 3.0 | 3.5 | 4.0 | 4.5 |

Figure 6:
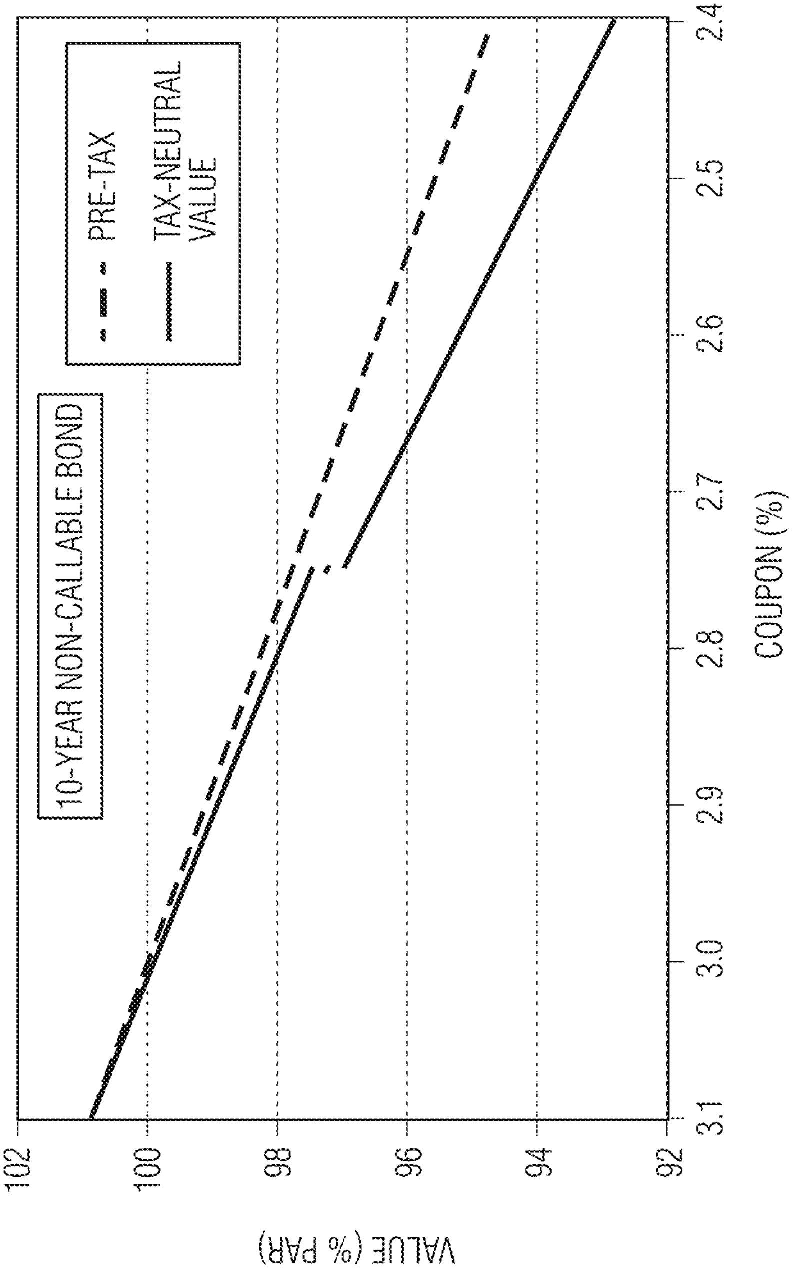
FIG. 6 is a graph of the tax-neutral value vs. coupon of 10-year bonds.

Initially, as shown in FIG. 6, it is noted that the pre-tax value of a discount muni exceeds its fair value by the present value of the taxes paid at the time the bond is redeemed. Here, the de minimis threshold is 97.50% of par (100−10*0.25). In the absence of taxes, a bond with a 2.72% coupon would be valued at 97.50%, but the tax on the gain reduces the value. Standing out in FIG. 6 is how the fair value "falls off the cliff" at this level. The "critical" coupon (discussed below) is 2.75%. But if the coupon is 2.74%, the fair value declines by 0.60% to 96.90%. The obvious reason is that above 97.50% the gain is taxed at the 15% capital gains rate, but below 97.50% the gain would be taxed at 35%.

As seen in the example above, for the given yield curve and bond structure (i.e., maturity and optionality) there is a theoretical coupon level where the fair value declines discontinuously (falls off the cliff). While in reality the price decline is not as abrupt as indicated by the disclosed model, this critical coupon level is still of practical interest. If a bond is purchased at a price slightly above the de minimis threshold, its price could take a large hit if rates rise modestly. Because the market anticipates this possibility, the price experiences downward pressure even though the bond has a coupon above the critical level. In a like manner, the prices can be higher than predicted by the present model if the coupon is slightly lower than the critical level.

For a given yield curve and optionless bond, the critical coupon can be determined in a straightforward manner.

Assume that the present value of a 10-year $1 annuity is $8.50, the discount factor for a cash flow occurring 10 years from now is 0.70, and the capital gains rate is 15%.

Solving $8.50*C+0.70*(100-0.15*2.5)=97.50$ results in $C=3.27\%$.

Note that the fair value of a bond whose coupon is slightly below 3.27% is $97.50-0.70*(0.35-0.15)*2.50$, or 97.15%.

In the case of tax-exempt bonds, it is imperative to recognize that the prices incorporate potential tax effects;

otherwise the interest rate sensitivity can be severely underestimated. The intuition is clear: higher rates depress the price, and a lower price increases taxes. This, in turn, puts additional pressure on the price, etc., until the iteration converges to the fair value.

Naturally, the higher the applicable tax rate the greater is the above effect, so it is most pronounced when the price is below the de minimis threshold. At the de minimis threshold, the price is discontinuous and, therefore, interest rate sensitivity is not defined. Whenever the tax treatment is discontinuous, it is desirable to distinguish between "up" and "down" durations.

Figure 7:
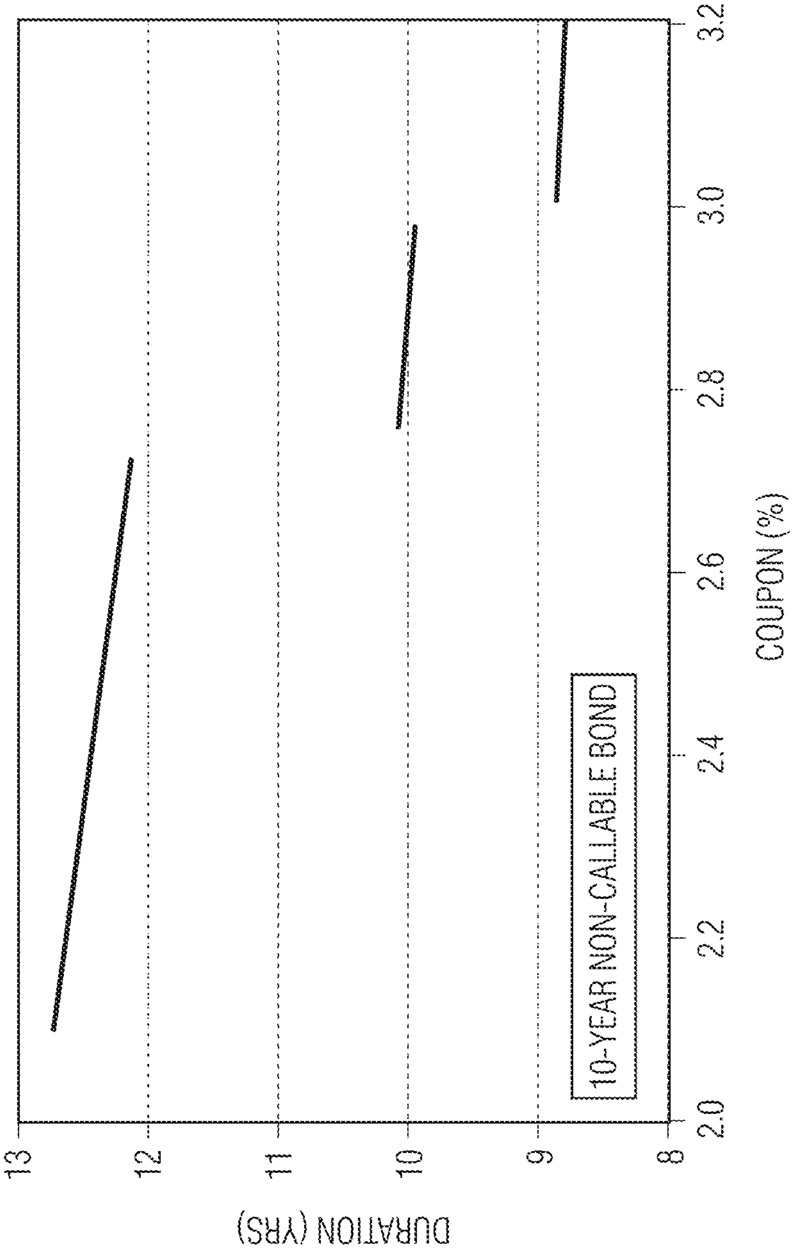
FIG. 7 is a graph of the duration of 10-year bonds of various coupons.

FIG. 7 displays the durations of 10-year optionless bonds. Recall that the critical coupon in this case is 2.75% (see FIG. 6). The durations of bonds with coupons below 2.75% exceeds 12 years, which is 2 years longer than the bonds' maturity. And durations exceed 10 years slightly even when the price is above the de minimis region (coupons larger than 2.75%).

Since the pretax duration of a bond cannot exceed the bond's maturity, any calculator that disregards taxes will severely underestimate the true duration of discount bonds. But the error is significant even if the price is close to par. For example, the pretax duration of a 3.00% bond is 8.85 years, which is considerably shorter than 10 years.

As described previously, interest rate risk measures are calculated using a fixed OAS relative to a benchmark yield curve. (A naive and erroneous approach is to use a fixed YTM or YTC spread to a given benchmark maturity.) It should be recognized that the OAS depends on whether or not the given price is assumed to reflect tax effects.

Suppose that the price of an optionless 10-year 2.5% bond is 84.15%; calculate its OAS relative to the benchmark curve given earlier.

$$\text{Pretax: } OAS = 148 \text{ bps, duration} = 8.87 \text{ years.}$$

$$\text{Tax-adjusted: } OAS = 100 \text{ bps, duration} = 12.15 \text{ years.}$$

The important observation is that correct calculation of interest rate risk requires an explicit adjustment for taxes. In the absence of such, the risk of tax-exempt bonds is underestimated.

Accordingly, using tax-neutral values as a foundation, it has been shown herein that the interest rate sensitivity of tax-exempt bonds can be significantly greater than indicated by pre-tax calculations, which has been the standard in the industry. The difference is most pronounced for shorter-term bonds selling below the de minimis level, whose duration can exceed their maturity by several years.

In light of the fact that under current practice the interest rate sensitivity of tax-exempt bonds is misspecified, the large tracking errors of "index-matched" ETF's and mutual funds are not surprising. Tax-adjusted analytics are essential for proper management of tax-exempt bond portfolios.

Computer System Architecture

Figure 8:
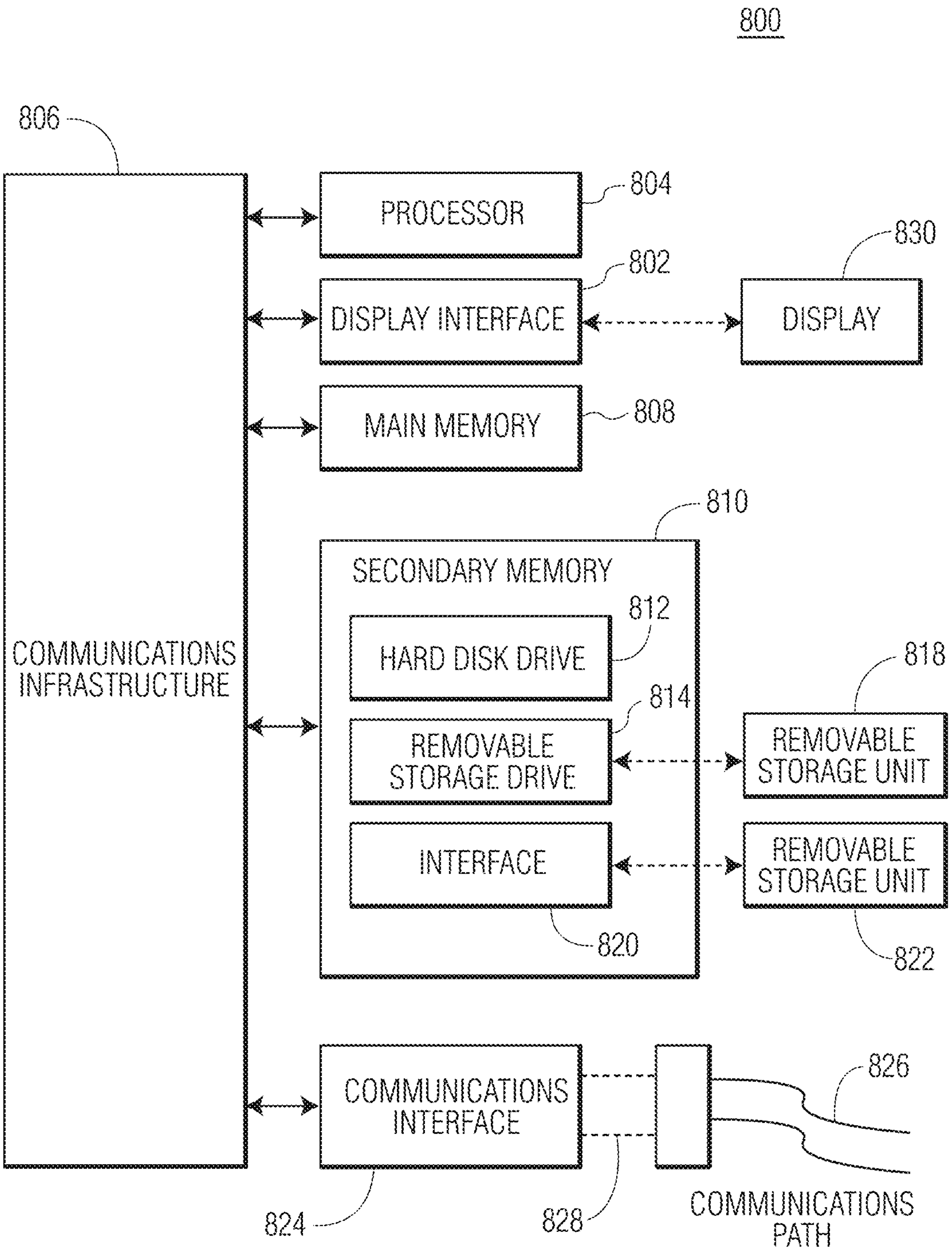
FIG. 8 is a block diagram illustrating system architecture of a computer system in accordance with exemplary embodiments.

FIG. 8 illustrates a computer system 800 in which embodiments of the present disclosure, or portions thereof, may be implemented as computer-readable code. For example, the computing system 102, the processing server 104, the purchaser computer device 110, and the private computer devices and servers 114 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 2-6.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor device as discussed herein may be a single processor, a plurality of processors, or combinations thereof. Processor devices may have one or more processor "cores". The terms "computer program medium", "non-transitory computer readable medium", and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

The computer system 800 includes a display 830 connected to a communications infrastructure 806 via a display interface 802. In an embodiment, the display 830, in conjunction with the display interface 802, provides a user interface (UI) for clients and purchasers. The computer system 800 also includes a processor device 804, which may be a special purpose or a general purpose processor device. The processor device 804 may be connected to a communication infrastructure 806, such as a bus, message queue, network (e.g., the network 18), multi-core message-passing scheme, etc. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive, the removable storage unit 818 may be a floppy disk. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals 828, which may be electronic, electromagnetic, optical, or other signals capable of being received by the communications interface 824, as will be apparent to persons having skill in the relevant art. The signals 828 may travel via a communications path 826, which may be configured to carry the signals and may be implemented using wire, cable, fiber optics, a phone line, a cellular phone link, a radio frequency link, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processing server 104 to implement the methods illustrated by FIGS. 2-6, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

Figure 9:
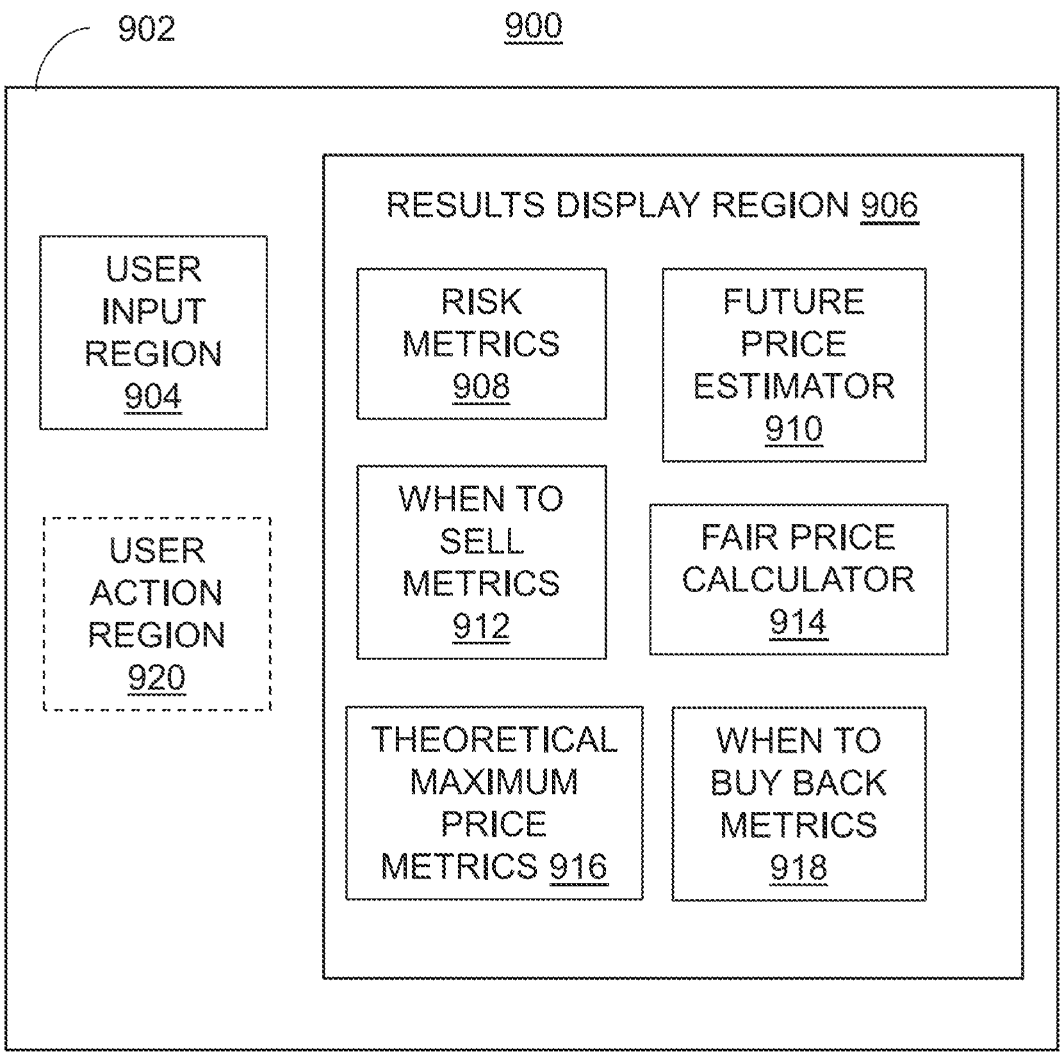
FIG. 9 is an illustration of an example interactive graphical user interface (GUI) for optimal management of one or more municipal debt offerings in accordance with an exemplary embodiment of the present disclosure.

FIG. 9 is an illustration of an example interactive GUI 900 for optimal management of municipal debt offerings, according to an aspect of the present disclosure. GUI 900 may include one or more windows 902 having various regions (e.g., regions 904-920) for interaction with valuation and risk management metrics (e.g., measures) for one or more municipal debt offerings. Although exemplary regions are depicted in FIG. 9, alternate configurations for the regions are envisioned. For example, a graphical user interface may contain more or fewer regions. Additionally, the regions may be reorganized in any manner and display other pertinent information. Moreover one or more of regions 904-920 may provide for presentation of and user interaction with data and information. In some examples, region 906 may represent various analysis results of optimal bond management 216 (FIG. 2).

In some examples, window 902 of interactive GUI 900 may include user input region 904, interactive results display region 906 and, in some examples, (optional) user action region 920.

Region 904 may provide any suitable user input tools such as buttons, text boxes, radio dials, pop-up windows, drop down menus, selectors and the like for providing user input into interactive GUI 900. In some examples, region 904 may include user input options for indicating a specific municipal debt offering (e.g., by selecting from a predetermined list, text input of a specific offering, selection based on a search, etc.) for determining (by computing system 102) optimal management metrics for the specific offering. In some examples, region 904 may be used to indicate one or more desired parameters for the valuation/risk analysis and/or additional characteristics of the specific offering. In some examples, region 904 may be used to select one or more metrics in region 906 to be analyzed as part of the optimal management analysis (e.g., as part of the valuation/risk analysis performed by computing system 102). In some examples, one or more of regions 908-918 (and, in some examples, region 920) nay be updated in response to any user input in region 904. Although region 904 is illustrated as being separate from regions 906-918 (and optional region 920, it is understood that region 904 may be part of one or more of regions 906-918 and 920.

Although not shown, in some examples, interactive GUI 900 may include one or more regions for providing one or more of market data, bond data (e.g., terms, yield curve data, interest rate volatility data) and tax data (e.g., IRS treatment data, applicable tax rates) for the specific (user-selected) offering to be analyzed. In some examples, one or more of regions 904, 906 and 920 may be updated in response to changes in any data (e.g., market data, bond data, and/or tax data) used by computing system 102 to determine optimal management metrics (and, in some examples available user actions in region 920). For example, one or more metrics (e.g., one or more indicators in region 906) may be updated responsive to any changes in the market price data and/or the interest rate volatility data.

Region 906 may include one or more regions for providing optimal management metrics for a specific municipal debt offering (selected by a user in region 904). For example, region 906 may include risk metrics region 908, future price estimator metrics region 910, when to sell metrics region 912, fair price calculator metrics region 914, theoretical maximum price metrics region 916 and when to buy back metrics region 918. Each metric may be presented as one or more indicators. Each of regions 908-918 may present the indicator(s) in one or more of a text format, a graphical format, as well as any other suitable format. In some examples, one or more of regions 908-918 may provide additional information related to the particular metric. In some examples, one or more of regions 908-918 may include one or more user input regions for interacting with a particular metric, where user input may cause the particular region to display additional information and/or update the existing metric indicator(s) and/or other information associated with the metric.

Risk metrics region 908 may provide (interactive) metrics determined by risk measure 218 (FIG. 2). Future price estimation metrics region 910 may provide (interactive) metrics based on estimated future prices 220 (FIG. 2). When to sell metrics region 912 may provide (interactive) metrics on the determination of when to sell at a loss 222 (FIG. 2). Fair price calculator metrics region 914 may provide (interactive) metrics based on calculation of a fair price (net asset value) 226 (FIG. 2). Theoretical maximum price metrics region 916 may provide (interactive) metrics on determined theoretical maximum price 224 (FIG. 2). When to buy back metrics region 918 may provide (interactive) metrics on when to buy back a municipal debt offering (e.g., a municipal bond) at a premium to book value on a secondary market, such that the issuer can realize a tax benefit (e.g., by paying a higher price than the par or cost to the issuer of the bond if it is held to maturity).

In some examples, optional user action region 920 may provide user-selectable options to buy, sell and/or modify a municipal debt offering. In some examples, different options may be presented (and/or be active for selection) in user action region 920, depending upon a metric region among regions 908-918) currently selected by a user (in region 906). For example, when region 912 is currently selected, user action region 920 may include an active selectable option to sell a specific offering. As another example, when region 918 is selected, user action region 920 may include an active selectable option to buy back a specific offering. In some examples, selection of a user action in user action region 920 may cause computing system 102 to initiate the selected user action (e.g., buy, sell, modify a specific offering) with at least one entity (e.g. at least one market such as a primary market and/or a secondary market, a bondholder, an issuer, a purchaser and the like). In some examples, user selectable actions in region 920 may include additional options for user input, such as a time period and/or date in which to perform the requested action.

In some examples, interactive GUI 900 may represent an example of the UI discussed above (e.g., display 830 in conjunction with display interface 802 (FIG. 8)). It should be understood that FIG. 9 represents a non-limiting example user interface, and that a differing interface configured in accordance with this disclosure may be provided for providing interactive presentation (and, in some examples, additional actions) with optimal management metrics for specific municipal debt offerings selectable by a user.

Techniques consistent with the present disclosure provide, among other features, systems and methods for the calculating of the after-tax value of a municipal debt instrument. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

It should also be understood that all references identified and/or referenced herein are incorporated fully by reference herein in their entireties.

The invention claimed is:

1. A non-transitory computer-readable medium storing computer-readable instructions that, when executed by at least one processor, cause the at least one processor to perform the functions comprising:

receiving, from a display device, via a communications interface, an indication of a bond;

determining, according to a predefined tax logic data interpretation process, a tax-neutral fair value of the bond based on a set of bond data and a set of tax data specific to the bond, such that the tax-neutral fair value is reflective of market price data;

determining, using the tax-neutral fair value of the bond and the market price data, according to a recursive valuation path dependent methodology, one or more indicators including at least one of a value of the bond enhanced by a tax option, a value of the tax option and a sell indicator comprising whether to sell the bond and take a loss;

receiving and displaying, via an interactive graphical user interface (GUI) on the display device, the one or more indicators in a results display region of the interactive GUI, the interactive GUI further comprising a user action region associated with the one or more indicators displayed in the results display region;

receiving, responsive to the one or more indicators displayed in the results display region, an indication of user input via the user action region of the interactive GUI; and initiating at least one transaction responsive to the indication of user input in the user action region.

2. The non-transitory computer-readable medium of claim 1, wherein the value of the tax option is determined by subtracting the tax-neutral fair value from the value enhanced by the tax option.

3. The non-transitory computer-readable medium of claim 1, wherein the functions further comprise:

determining, using the tax-neutral fair value, risk measures for the bond given its price, the risk measures comprising at least one of effective duration, effective convexity and key rate durations.

4. The non-transitory computer-readable medium of claim 1, wherein the functions further comprise:

determining an option-adjusted spread of the bond at a given price relative to a benchmark yield curve; and determining the tax-neutral fair value of the bond at the determined option-adjusted spread.

5. The non-transitory computer-readable medium of claim 1, wherein the determining of the one or more indicators further comprises:

estimating future prices of the bond under a specified interest rate scenario over time.

6. The non-transitory computer-readable medium of claim 1, wherein the determining of the one or more indicators further comprises:

determining when to sell the bond at the loss based on the tax-neutral fair value and the value enhanced by the tax option.

7. The non-transitory computer-readable medium of claim 1, wherein the determining of the one or more indicators further comprises:

determining the value of the tax option for the bond based on the tax-neutral fair value and the value enhanced by the tax option.

8. The non-transitory computer-readable medium of claim 7, wherein the functions further comprise:

setting the tax-neutral fair value as a minimum price for the bond.

9. The non-transitory computer-readable medium of claim 1, wherein the set of bond data comprises terms, yield curve data and interest rate volatility data specific to the bond.

10. The non-transitory computer-readable medium of claim 9, wherein the terms include interest payments to be made at least one of periodically and at maturity.

11. The non-transitory computer-readable medium of claim 9, wherein the yield curve data comprises at least one benchmark yield curve.

12. The non-transitory computer-readable medium of claim 9, wherein the functions further comprise:

updating the one or more indicators displayed in the results display region on the display device responsive to changes in at least one of the market price data and the interest rate volatility data for the bond.

13. The non-transitory computer-readable medium of claim 1, wherein the set of tax data comprises IRS tax rate treatment data and applicable tax rates specific to the bond.

14. The non-transitory computer-readable medium of claim 1, wherein the sell indicator indicates at least one of when to sell the bond and when a loss for tax purposes will occur.

15. The non-transitory computer-readable medium of claim 14, wherein the functions further comprise:

determining the sell indicator such that a performance of the bond is improved by taking the loss compared to a buy-and-hold policy.

16. The non-transitory computer-readable medium of claim 1, wherein the one or more indicators further comprise one or more of risk measures, one or more estimated future prices, one or more fair prices, a theoretical maximum price and a buy back indicator.

17. The non-transitory computer-readable medium of claim 1, wherein the functions further comprise:

storing, in a database, bond data and tax data for one or more tax-exempt municipal bonds, including the bond of the received indication.

18. The non-transitory computer-readable medium of claim 17, wherein the functions further comprise:

receiving, via the communications interface, the market price data, the bond data and the tax data from among one or more data sources.

19. The non-transitory computer-readable medium of claim 17, wherein the functions further comprise:

retrieving the set of bond data specific to the bond from among the bond data stored in the database; and retrieving the set of tax data specific to the bond from among the tax data stored in the database.

* * * * *